United States Patent
Falicoff et al.

(10) Patent No.: US 8,277,085 B2
(45) Date of Patent: Oct. 2, 2012

(54) COMPACT LED DOWNLIGHT WITH CUSPATED FLUX-REDISTRIBUTION LENS

(75) Inventors: Waqidi Falicoff, Stevenson Ranch, CA (US); William A. Parkyn, Lomita, CA (US)

(73) Assignee: Light Prescriptions Innovators, LLC, Altadena, CA (US)

( * ) Notice: Subject to any disclaimer, the term of this patent is extended or adjusted under 35 U.S.C. 154(b) by 473 days.

(21) Appl. No.: 12/587,246

(22) Filed: Oct. 5, 2009

(65) Prior Publication Data

US 2010/0110676 A1    May 6, 2010

Related U.S. Application Data

(60) Provisional application No. 61/195,290, filed on Oct. 6, 2008, provisional application No. 61/273,321, filed on Aug. 3, 2009.

(51) Int. Cl.
*F21V 7/00*        (2006.01)

(52) U.S. Cl. ............. 362/296.01; 362/297; 362/341
(58) Field of Classification Search ............. 362/296.01, 362/235, 145, 297, 304, 341
See application file for complete search history.

(56) References Cited

U.S. PATENT DOCUMENTS

| | | | | |
|---|---|---|---|---|
| 6,478,454 B1 * | 11/2002 | Jaffari et al. | ............ | 362/307 |
| 7,083,313 B2 * | 8/2006 | Smith | ............ | 362/555 |
| 7,350,930 B2 * | 4/2008 | Lee et al. | ............ | 353/98 |
| 2005/0286251 A1 | 12/2005 | Smith | ............ | 362/327 |
| 2006/0104065 A1 | 5/2006 | Lee et al. | ............ | 362/341 |
| 2007/0279911 A1 | 12/2007 | Kittelmann et al. | ............ | 362/328 |

* cited by examiner

*Primary Examiner* — John A Ward
(74) *Attorney, Agent, or Firm* — Drinker Biddle & Reath LLP

(57) ABSTRACT

A lighting device has a light source, a reflector dish with a central opening facing the light source, and a lens between the light source and the reflector dish. The lens is so arranged that light emitted from the source towards the central opening of the reflector dish is diffracted away from the central opening. The reflector dish is arranged to reflect light received from the source through the lens back past the lens and source.

19 Claims, 8 Drawing Sheets

COMPACT LED DOWNLIGHT WITH CUSPATED FLUX-REDISTRIBUTION LENS

CROSS REFERENCE TO RELATED APPLICATIONS

This application claims benefit of U.S. Provisional Applications Nos. 61/195,290 filed Oct. 6, 2008, and 61/273,321 filed Aug. 3, 2009, which are incorporated herein by reference in their entirety. Reference is also made to U.S. patent application Ser. No. 12/387,341 titled "Remote-Phosphor LED Downlight," filed May 1, 2009 by the same inventors, which is incorporated herein by reference in its entirety, and to U.S. Provisional Application No. 61/205,390, filed Jan. 16, 2009 by Falicoff and Sun, which is incorporated herein by reference in its entirety.

BACKGROUND OF THE INVENTION

Downlights are lighting fixtures typically mounted in ceilings for illumination directly below them. Conventionally, these ubiquitous luminaires generally comprise an incandescent spotlight mounted within a can. Since incandescent bulbs operate hot anyway, they are not thermally bothered by the can being a trap for hot air. It would be highly desirable to replace incandescent light bulbs with lamps using light-emitting diodes (LEDs), because LEDs last much longer and use much less electricity than incandescent bulbs. However, even LEDs produce a significant amount of heat (about ¾ of their electrical power consumption) and LEDs are temperature-vulnerable, so that downlights are a more difficult lighting application than anticipated. This is because the optics of a conventional downlight dictate that the actual light source be installed at the top of the can, facing downwards. The waste heat of the LEDs cannot very effectively be dissipated passively into the stagnant hot air of the typical downlight can. This poor heat dissipation typically limits the total electrical power that can be handled in a solid state LED downlight to a maximum of approximately 5 watts.

This power limit can only be overcome if the can is dramatically increased in size to aid in heat management, or if active cooling or ventilation is provided, a severe limitation. Furthermore, the best commercially available 5 watt LED sources have an efficacy of 60 lumens per Watt (LPW), including driver losses. This limits such a solid-state downlight to a flux of approximately 300 lumens. It would be desirable to have a standard size solid state downlight producing 600 to 1000 lumens. That light output is achievable only if the heat management can handle a minimum of 10 watts, which mandates moving the LEDs down from the top of the can.

It is possible to install LEDs at the luminous aperture of the downlight, facing upwards. This is in some respects similar to an entirely traditional arrangement of a light-bulb within a reflector. However, when a solid-state light source with hemispheric emission is substituted for an incandescent lamp with almost spherical emission, the reflector dish does not have to be as deep. Also, the LED is mounted facing upward, so that its entire light output is directed into the reflector, where the incandescent bulb is usually mounted with its base upward, so that its central rays are emitted directly downwards, and the base forms a dead area at the center of the reflector.

As an example, FIG. 1 shows an LED downlight 100, comprising downward-facing reflector dish 101 and upward-facing LED light source in the form of light engine 110. Light engine 110 in turn comprises chip array 111, dome 112, package 113, circuit board 114, and heat-sink 120. The exact shape of reflector dish 101 would be dictated by the desired width and prescription of its output pattern.

It is further possible to utilize another employment of light-emitting diodes, within an integrating cavity, the exit aperture of which would shine upward into a downward-facing reflector dish. FIG. 2 shows another example of an LED downlight 200, comprising downward-facing reflector dish 201 and upward-facing light engine 210. Light engine 210 in turn comprises multiple chip arrays 211 positioned within integrating box 212, the light output of which shines upwards out through exit aperture 213. The interior walls of box 212 are diffusely reflective, as with white paint. They also would be thermally conductive, conveying heat from the chips 211 to finned heat sink 220. Exit aperture 213 can include a diffuser, for color mixing in the case of chip arrays 211 being of different colors, such as red, green, and blue.

Thirdly, it is possible to utilize a remote phosphor light source shining upwards into a downward-facing reflector dish. FIG. 3 shows a further example of an LED downlight 300, comprising downward-facing reflector dish 301 and upward-facing light engine 310. Light engine 310 comprises multiple chip arrays 311 positioned within integrating box 312. All of the chips are blue-emitting, however, in order to stimulate transparent-mode remote phosphor 313, which covers the outlet of integrating box 312. Most of the blue light striking phosphor 313 will be converted to yellow light, and the remaining blue light combines with the yellow converted light to make a balanced white output. Yellow light, as well as reflected blue light, will also shine back within the integrating box 312 and be recycled back upon the remote phosphor 313. Optionally, the multi-chip array can include one or more secondary red or other color LEDs (including secondary blue LEDs of a different wavelength blue from the primary blue LEDs) so that the light source can produce a range of color temperatures. By adjusting the output of these secondary LEDs, either when the light source is manufactured or in operation, the source can, for example, emulate the light from an incandescent lamp (typically from 2700 to 3000K color temperature) or a cool white light source.

FIG. 3 also shows two items that may be present in the luminaires 100, 200, but are omitted from FIGS. 1 and 2 for the sake of clarity. Exemplary structural support vane 330 keeps light source 310 in position and provides a conduit for wiring or the like for power supply and electronic control. In a typical practical construction, two or more vanes are used to produce a structurally stable configuration without requiring a very stiff, bulky vane. Exemplary ray 340 proceeds from remote phosphor 313 and is reflected downward to subtend output angle 341 with the vertical. In general, the shape of the reflector dish is adapted for a particular desired distribution of such output angles for all rays from the light source. This distribution in turn depends upon the downlight's illumination goals, which typically are uniform illumination over a nearby plane, such as a floor or table.

These configurations are disclosed as examples of previously-proposed designs for LED downlights. They suffer from two problems, however. The light source and its heat sink project well below the reflector dish, an aesthetic problem which can only be solved by positioning the entire assembly within a ceiling-can that will shield the heat sink from view (shown respectively as can 150 in FIG. 1, can 250 in FIG. 2, and can 350 in FIG. 3). This in turn will cause the accumulation within the can of hot air from the heat sink, leading to overheating of the LED chips within the light source. Also, using this approach the light source and its associated components typically block some of the light coming from the reflector. In such a previous design approximately 10% is lost. Finally, this system must employ a reflector that does not have a vent hole at its top (if it is not to incur a further drop in efficiency because of light lost through the vent hole). Such a vent hole is desirable if convective thermal heat transfer is to be maximized. The present invention makes it possible to solve, or at least mitigate, some or all of these problems with the introduction of a further optical element, a flux-redistribution lens.

SUMMARY OF THE INVENTION

Embodiments of the present invention provide a reflector-dish LED downlight with a novel type of lens positioned over the light source and optically coupled to it so that a full hemispheric distribution is obtained within the lens. The lens profile has a central cusp that receives upward-going light and deflects it outwards, allowing the reflector dish to have a central hole that will act as a chimney to promote air circulation around the heat sink.

The lens profile of one preferred embodiment will also deflect light below horizontal so that the reflector dish becomes deep enough to entirely enclose the light source. Because the reflector dish divides the interior of the can, air is able to circulate upwards inside the dish and downwards outside the dish but inside the can. The above-discussed problem of hot air being trapped within the can when the can and dish both extend downwards below the light engine may consequently be greatly mitigated. Alternatively, the lens deflects at the center, graduating to zero deflection horizontally, so the reflector profile does not extend below the source. In addition, the same lens can be used with different reflector dishes in order to generate different sized illuminated circles on the target plane. The exact shape of the dish will also determine the distribution of illumination, whether uniform, centrally peaked, or centrally darkened.

An embodiment of the invention provides a light comprising a light source with an exit aperture, a cuspated flux-redistribution lens disposed over said aperture, and a reflector dish with a central opening disposed over the lens. The lens is in optical communication with the exit aperture. The light passes through an outer surface of the lens, the outer surface is shaped so as to diverge the light as it exits into air. The diverged light has a central region of zero intensity corresponding to the central opening. The reflector dish receives the diverged light and reflects the diverged light back round the lens and light source. The reflector dish shaped so as to produce a specified beamwidth.

The light source may be an LED light source, wherein the lens is in optical contact with the exit aperture such that light from the exit aperture has a hemispheric distribution within the lens, the diverged light having the aforementioned zero intensity at off-axis angles less than a selected angle having a value between 10° to 30°, and the reflector dish receiving the diverged light and reflecting it downwards with a specified beamwidth between 20° and 60°.

The flux-redistribution lens may be circularly symmetric. The flux-redistribution lens may have a radial cross-section that is an equiangular spiral. The flux-redistribution lens may have a radial cross-section that is a spiral in which the angle between a radius and the perpendicular to the surface decreases linearly from a predetermined angle on the axis to zero perpendicular to the axis.

The specified beamwidth may illuminate a planar target with a prescribed radial distribution of illuminance.

The prescribed radial distribution of illuminance may be generated by the reflector sending rays from its center to the outer periphery of the prescribed radial distribution of illuminance and rays from its outer edge to the center of the prescribed radial distribution of illuminance.

The prescribed radial distribution of illuminance may be generated by the reflector sending rays from its center to the periphery of the prescribed radial distribution of illuminance on the same side of the axis and rays from the outer edge of the reflector to the periphery of the prescribed radial distribution of illuminance on the opposite side of the axis.

The light source may be an integrating box with an exit aperture, which box comprises walls with one or more LED chips disposed thereupon, the walls being sufficiently thermally conductive to remove waste heat from the LED chips, the interior surface of the walls being diffusely reflective, the exterior surface of the walls also comprising a heat sink for convective heat removal by ambient air.

The LED chips may be of multiple colors, the colors being populated in proportions attaining colorimetric white. The exit aperture may include a transmissive diffuser.

The exit aperture may comprises a transmissive phosphor layer, the LED chips comprising LED chips that emit photostimulative short wavelengths, and the phosphor layer of such density of photostimulated species as to attain colorimetric white in combination with transmitted light from said LED chips.

The flux-redistribution lens may have a central indentation on its rear surface. The central indentation may have a phosphor coating. The central indentation may have a diffusive surface.

BRIEF DESCRIPTION OF THE DRAWINGS

The above and other aspects, features and advantages of the present invention will be apparent from the following more particular description thereof, presented in conjunction with the following drawings wherein.

DETAILED DESCRIPTION OF THE PREFERRED EMBODIMENTS

A better understanding of various features and advantages of the present invention may be obtained by reference to the following detailed description and accompanying drawings, which set forth illustrative embodiments in which principles of the invention are utilized.

Figure 4:
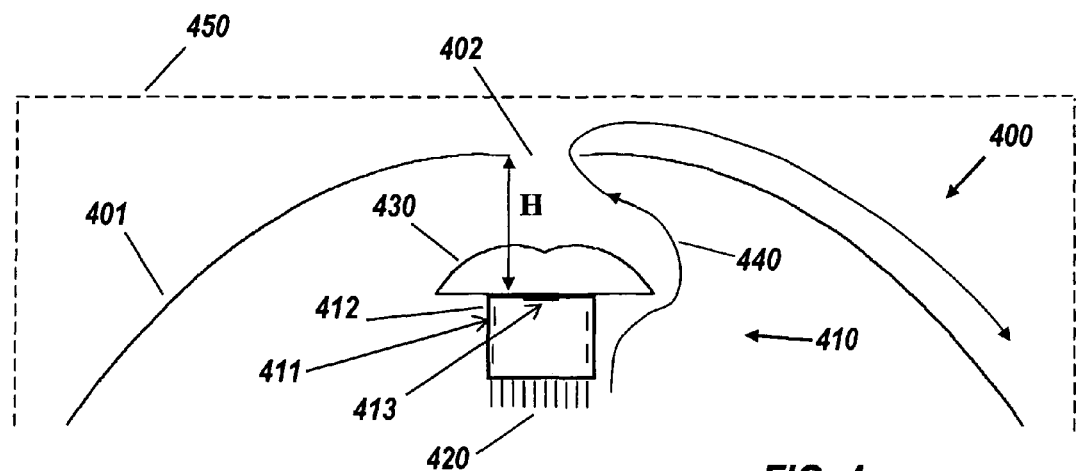
FIG. 4 shows an LED downlight featuring a flux-redistribution lens and a central aperture in the reflector dish.

Referring to FIG. 4, one embodiment of an LED downlight, indicated generally by the reference number 400, comprises downward-facing reflector dish 401 featuring central opening 402, and light engine 410, comprising flux-redistribution lens 430 and integrating light box 412, which contains blue LED chips 411. The integrated output of LED chips 411 shines upon remote phosphor 413, which is coated directly upon the rear surface of lens 430. Lens 430 is placed so that remote phosphor 413 covers the outlet opening of integrating light box 412, and faces directly towards central opening 402 of reflector dish 401. Finned heat sink 420 projects from the bottom of light box 412, and generates hot air that travels upward on convective path 440, going through opening 402 and descending outside reflector dish 401 within ceiling can 450 to rejoin the ambient air. The overall size of reflector dish 401 scales with the height H of central opening 402 above light box 412.

Figure 5:
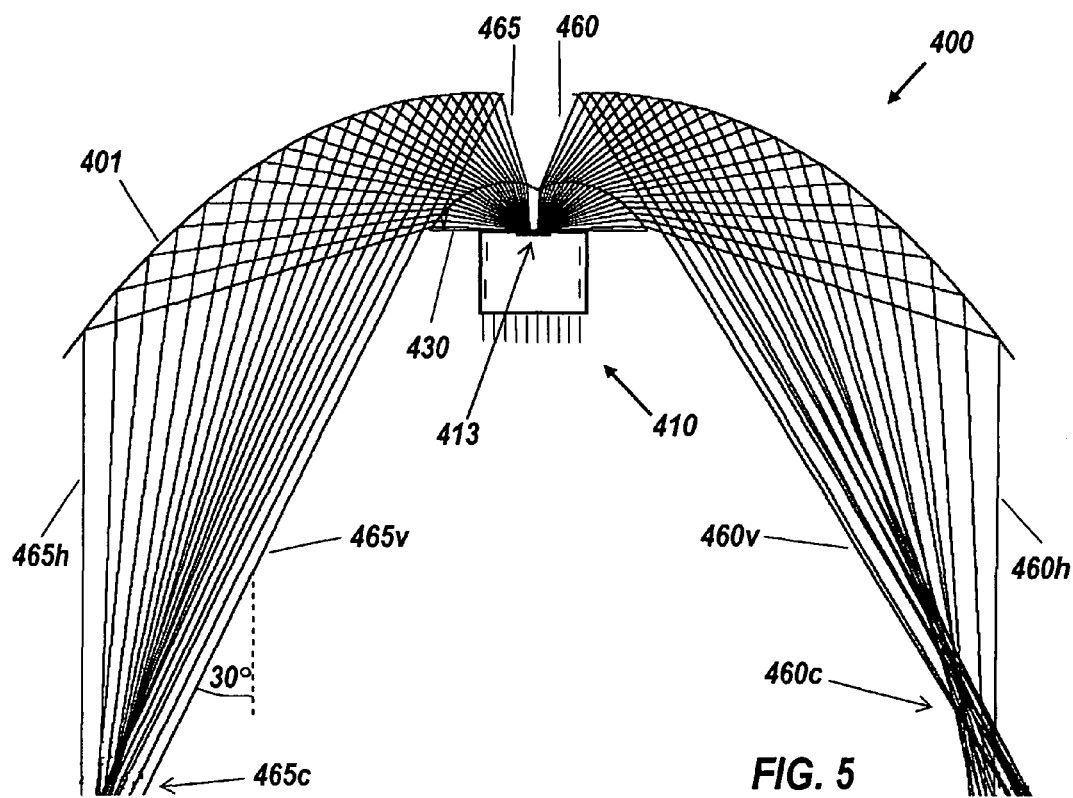
FIG. 5 shows a ray pattern of the downlight shown in FIG. 4.

FIG. 5 shows LED downlight 400 with reflector dish 401 and lens 430, with exemplary ray fans 460 on the right and 465 on the left, both subtending 90° at the remote phosphor 413 at the outlet alight box 411. Ray fan 460 proceeds from the center of the bottom surface of lens 430, while ray fan 465 proceeds from the edge of remote phosphor 413. Rays 460v and 465v, originally vertical, are refractively deflected by the top surface of lens 430 so as to miss opening 402, which as a result receives no light. Reflector dish 401 deflects these rays to an off-axis angle of 30° so that no rays returning downwards after reflection by reflector dish 401 intercept lens 430. Rays 460h and 465h, originally nearly horizontal, are refractively deflected downwards by the top surface of lens 430 so as to strike the outer edge of reflector dish 401, which reflectively deflects them so that they converge towards the center of the target 480 (see FIG. 6). Note that the ray sets respectively form caustics 460c and 465c, resulting in a light beam with a unique near-field beam structure, a ring caustic surrounding a dark zone. From the caustic the beam spreads out into the desired far-field distribution.

The profile of the reflector dish can be tailored for a specific beam half angle and a specific intensity distribution across the beam. One example is uniform intensity, but this does not produce uniform illuminance on a planar target. For the latter, a $\cos^{-3}$ distribution is necessary, which increases outwards from the axis to a maximum at the edge of the beam. The scale height H of FIG. 4 must be large enough in relation to the diameter of lens 430 for initially vertical ray 460v to clear the outer edge of the lens 430.

The efficiency of this optical system can be very high especially if the lens has an anti-reflective coating and the reflector coating materials are optimized for high reflectance. Remote phosphor systems have other efficiency advantages, as described in U.S. Pat. Nos. 7,286,296 and 7,380,962 (also by the inventors) which are incorporated herein by reference in their entirety. However, the downlight 400 can also work well if the remote phosphor is replaced with an efficient diffuser. In this case the blue LEDs can be replaced with white LEDs (blue LEDs coated with a yellow phosphor), a suitable mix of LEDs of different colors, or a combination of white and colored LEDs. Alternatively, high efficacy can be achieved using a combination of blue LEDs with a conformal green phosphor with red LEDs, as first taught in U.S. Pat. No. 7,144,121.

Figure 6:
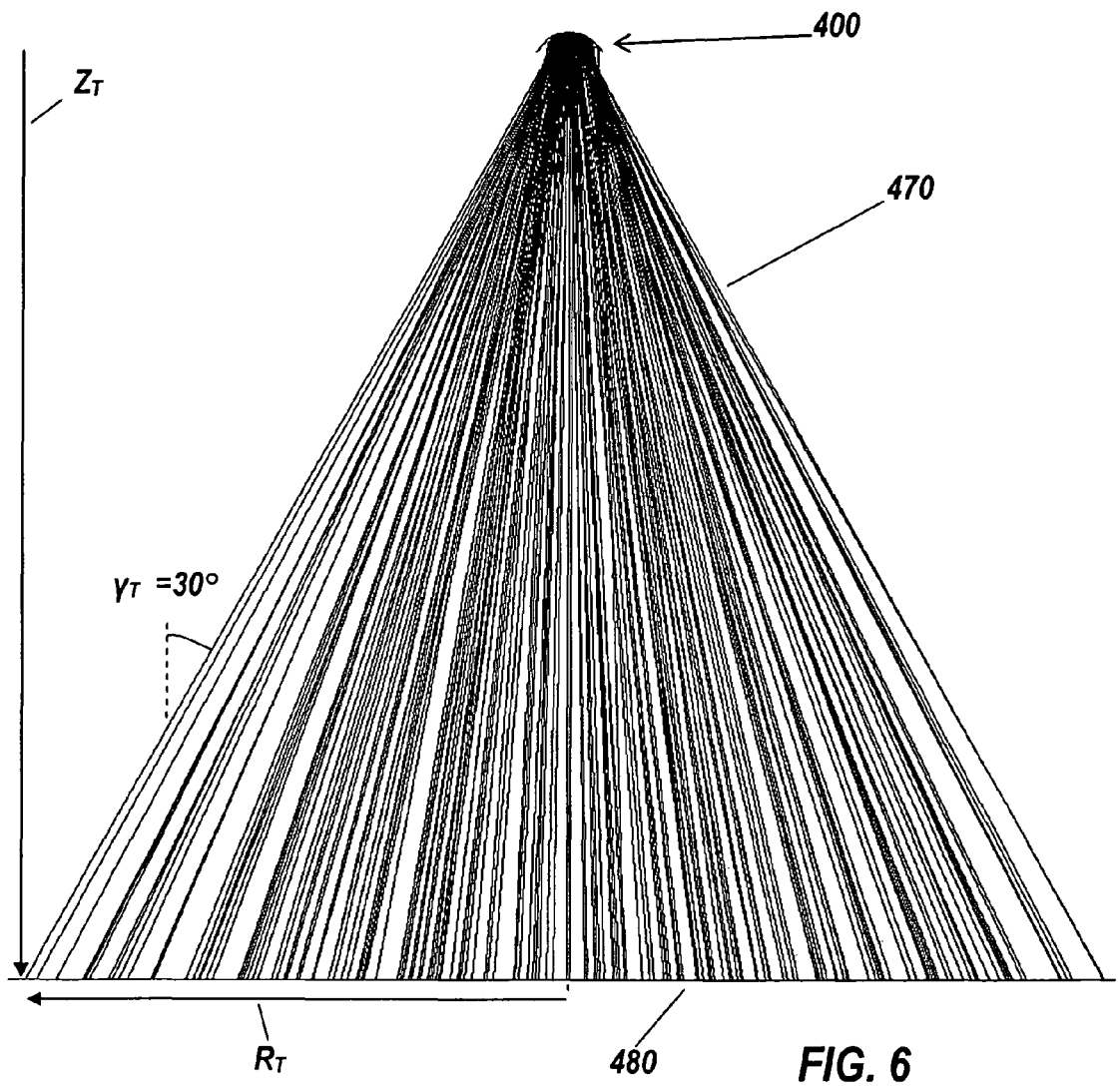
FIG. 6 shows illumination by the downlight shown in FIG. 4.

FIG. 6 shows LED downlight 400 producing ±30° diverging beam 470, though without the detail necessary to show the aforementioned unique beam caustics just below the downlight. Planar illumination target 480 is at distance $Z_T$ below the lens and approximately has radius $R_T = Z_T \tan \gamma_T$ for beam half angle $\gamma_T$.

Figure 7:
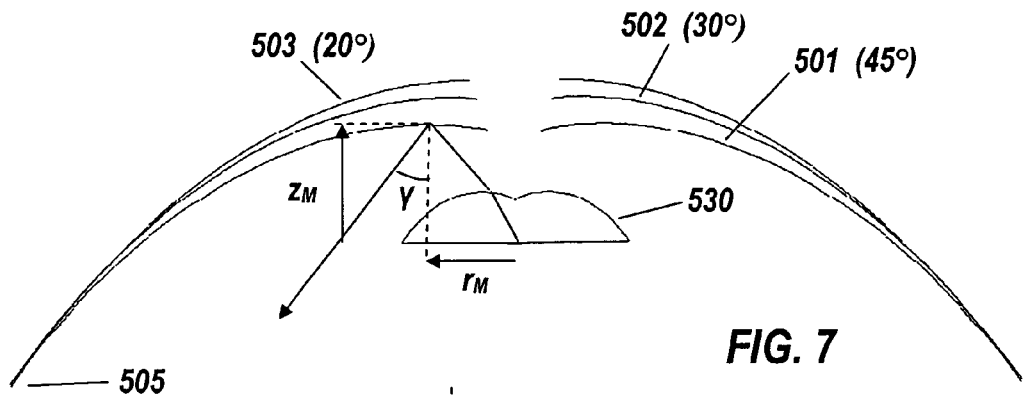
FIG. 7 shows three possible reflector profiles for an LED downlight.

FIG. 7 depicts a range of possible profiles for the reflector dish, all for the same spiral lens 530. Profile 501 will produce a ±45° beam achieving uniform illuminance on a planar target, profile 502 produces a ±30° beam, and profile 503 produces a ±20° beam. All three profiles terminate at the outer rim at the same place, point 505, because that point intercepts the outermost ray from lens 530, corresponding to ray 460h or 465h in FIG. 5, and deflects that ray to the center of the same target plane in all three cases. The mirror profile is specified by the cylindrical coordinates $r_M$ and $z_M$ of a sufficiently numerous list of points. At each such point the surface of the reflector dish deflects upward-going light into a downward angle γ (positive outwards, negative inwards), so that the ray hits the target at a radial distance given by $$r_T = r_M + (z_M + Z_T) \tan \gamma$$

The profile of the reflecting dish has local slope angle $\rho_M$ (positive being upward sloping as $r_M$ increases). Light coming from spiral lens 530 at angle β (as shown in FIG. 8) is reflected into the required angle γ, giving $$\rho_M = \tfrac{1}{2}(\gamma - \beta)$$

Specifying the mirror slope at enough angles β enables a numerical integration to generate the mirror profile. A different profile for lens 530 will require a different tailored reflector to achieve the specified beam output. Alternatively, the lens and its associated reflector can be designed using the Simultaneous Multiple Surface (SMS) Method of U.S. Pat. No. 6,639,733, also by one of the inventors, which is incorporated herein by reference in its entirety. One skilled in the art of SMS method would need to modify the XR design approach described in U.S. Pat. No. 6,639,733 to obtain a solution which has a reflector with a hole at its center.

Figure 8:
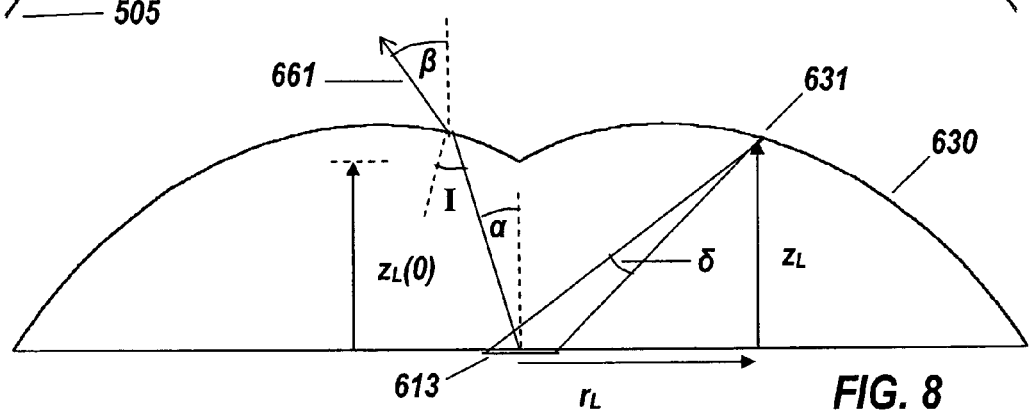
FIG. 8 is a close-up view of a lens with a spiral profile.

FIG. 8 shows the cross-sectional profile of cuspated spiral lens 630, with exemplary ray 661 emitted into the lens from the phosphor or diffuser 613 at angle α relative to the system axis, intersecting the surface of lens 630 at incidence angle I, and refracted thereby into angle β relative to the system axis. At any point 631 on the lens, the emitting zone 613 subtends angle δ, which determines its intensity function I(α), which generally will be given by the Lambertian function cos α when emitting zone 613 is a diffuser or a remote phosphor. (For an emitting zone with a different function, see FIG. 14). In the Lambertian case the cumulative intensity C(α) becomes $\sin^2 \alpha$. This function has to be matched with the cumulative intensity $C(\gamma) = 1 - (r_T/R_T)^2$, for uniform target illuminance, giving a desired value of γ (FIG. 7) for every value of α (FIG. 8). At the center of the lens, α=0° for a ray from the center of the phosphor or diffuser 613, light is deflected into the angle β(0)=20°, an angle selected to prevent the total internal reflection caused by larger values but still large enough for a good-sized central hole in the reflector dish. It will be understood by those skilled in the art that the overall lens size, as determined by the choice of cusp height $Z_L(0)$, must be sufficiently larger than phosphor patch 613 for this flux-redistribution arrangement to function, in accordance with the small-angle regime of the paraxial approximation. The aforementioned SMS method can, however, operate better when the phosphor is larger.

In the embodiments shown in FIG. 6, light that is initially horizontal is deflected downward at the edge of the lens enough so that, when the edge of the dish is positioned to intercept this light, the dish goes down far enough to shield the light box from view. Thus it is easiest to make the 20° angle of deflection at the lens surface constant for the entire lens, so that incidence angle I is a constant 32° (and the refraction angle is a constant)52° for n=1.495. This causes the lens profile to become an equiangular spiral, so that the distance $R_L$ to any point on the lens is given by $R_L=z_L(0) \exp(\alpha \tan I)$, with radial coordinate (from the optical axis of the downlight) $r_L=R_L \sin \alpha$ and axial coordinate (from the plane of the emission zone 613) $z_L=R_L \cos \alpha$.

Figure 9:
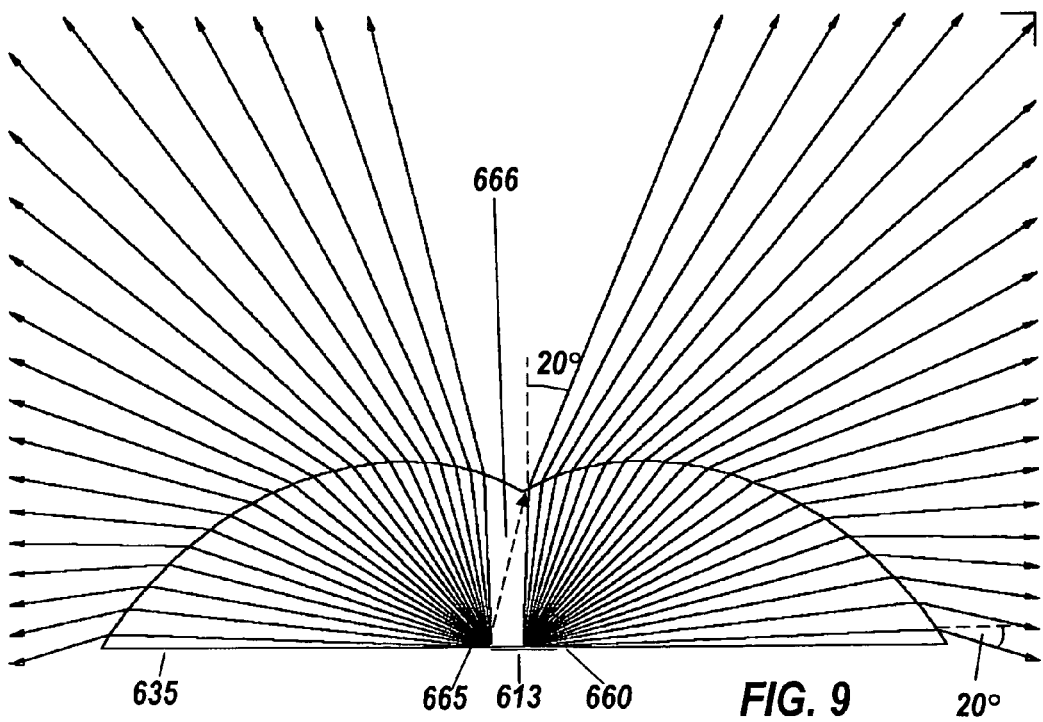
FIG. 9 shows the ray deflections of the lens shown in FIG. 8.

FIG. 9 further shows lens 630 of FIG. 8, including 90° ray-fans 660 at the center and 665 at the edge of emission zone 613. All rays are deflected 20° by the spiral shape of lens 630. Edge ray 666 is shown running from the edge of zone 613 to the central cusp. In order to exit the lens its angle of incidence at the lens surface must be less than the critical angle $\theta_C=\sin^{-1}(1/n)$ determined by the refractive index n of the lens material. Because the absolute angle of the lens surface immediately adjacent to the cusp has already been determined, this gives the maximum angle to the axis of edge ray 666. That in turn gives the minimum size the lens must have to prevent such TIR or the maximum size of emission zone a lens can handle, because the angle effectively defines a maximum ratio of the size of the lens to the size of the emission zone. If a larger emission zone 613 is used relative to the size of lens 630, the internally reflected light will go to the bottom surface 635 of the lens, which therefore may then be coated with a mirror so the light will be returned upwards to join the beam. If the reflector dish is slightly diffusive or has peening features, this stray light will not detract from beam uniformity.

Figure 10:
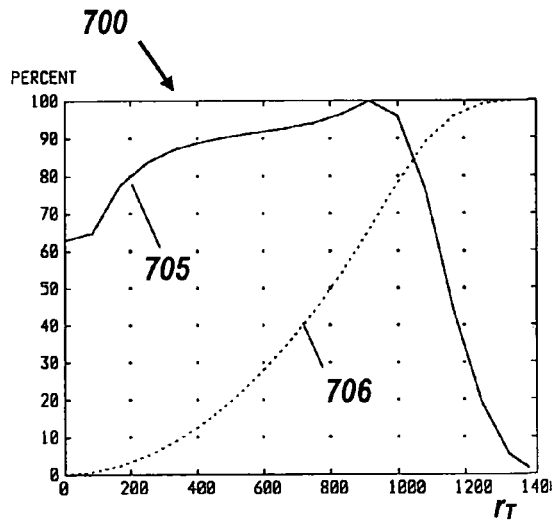
FIGS. 10 through 13 show radial illuminance graphs of the outputs of uncorrected and corrected reflector-dish profiles.

FIG. 10 shows the results of ray traces of LED downlight 400 of FIG. 4 when its reflector dish is generated by $C(\gamma)=C(\alpha)$, a one-to-one match of the cumulative illuminance distribution on the target with the cumulative intensity distribution within the lens. Graph 700 plots percent against radial target coordinate $r_T$, with curve 705 showing illuminance as a percent of maximum and curve 706 showing the actual cumulative distribution $C(r_T)$. This plot shows a central reduction of illuminance, where uniformity was desired. The solution is to alter the desired cumulative distribution of target illuminance from the aforementioned quadratic function of uniform illuminance to one that systematically takes smaller values in order to deflect more light inwards.

Figure 11:
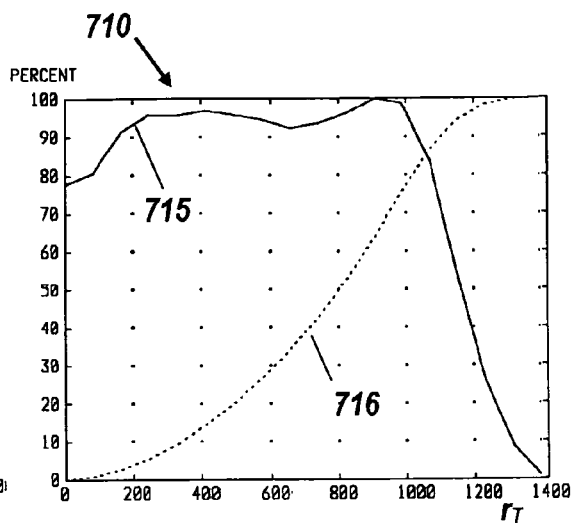

FIG. 11 shows the results of ray traces of LED downlight 400 of FIG. 4 when its reflector dish is generated by $C(\gamma)=[C(\alpha)]^{1.05}$, so that relative illuminance curve 715 has less of a central darkening. The cumulative illuminance distribution curve 716 is also shown.

Figure 12:
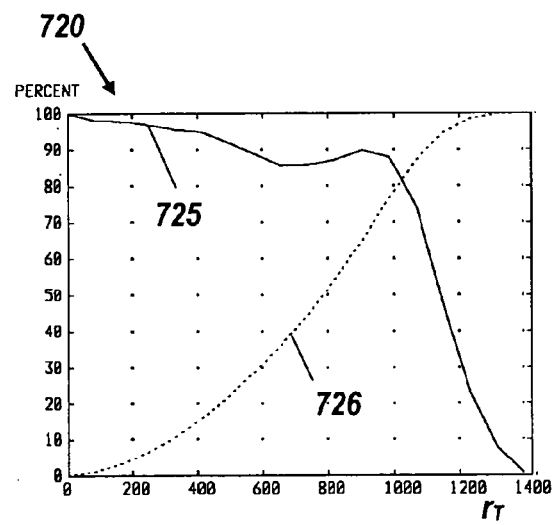

FIG. 12 shows the results of ray traces of LED downlight 400 of FIG. 4 when its reflector dish is generated by $C(\gamma)=[C(\alpha)]^{1.11}$, so that relative illuminance curve 725 has less of a central peak. The cumulative illuminance curve 726 is also shown.

Figure 13:
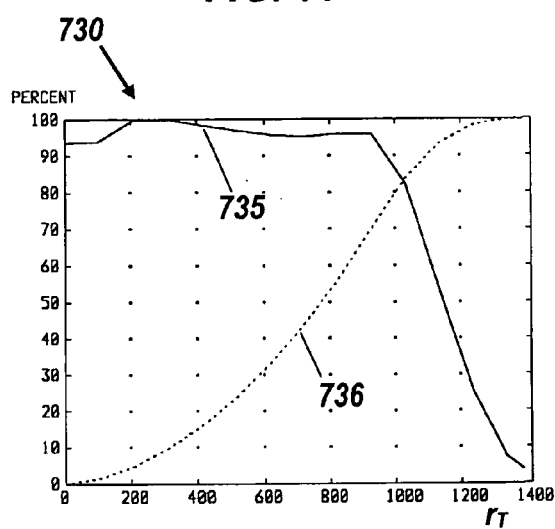

FIG. 13 shows the results of ray traces of LED downlight 400 of FIG. 4 when its reflector dish is generated by $C(\gamma)=[C(\alpha)]^{1.08}$, an intermediate value resulting in relative illuminance curve 735 being nearly constant. The cumulative illuminance curve 736 is also shown.

These graphs are specific to a single size of emission zone 413, so that a larger zone and a mirrored rear surface of the lens will give less uniform results with these values of the exponent of $C(\alpha)$.

Figure 14:
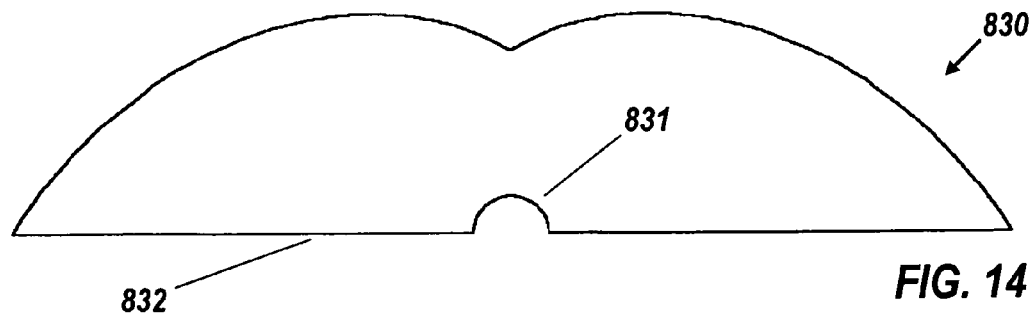
FIG. 14 shows the profile of a cuspated lens with a hemispheric emitter.

FIG. 14 shows a further embodiment of a spiral lens 830, with a hemispheric indentation 831 at the center of its rear surface 832. The hemispheric surface of indentation 831 could either have a diffuser to integrate the light from a multicolor light box, or a remote phosphor coating to receive light from a blue-LED light box. The vertical profile of this light-emitting indentation gives a more filled out distribution than the Lambertian one generated by a flat emitting zone, which sends zero intensity sideways. In contrast, a hemisphere sends half as much light sideways as it does straight up. Moreover, giving rear surface 832 an optical-quality polish will allow total internal reflection to make the lateral emission as strong as the vertical, by adding a reflected image so that indentation 831 appears as fully spherical from the side as it does from above. This leads to a more uniform illumination of the reflector than with a flat emitting zone, and thus better economic use of the reflector material. Because of the shape of the lens, the angle δ (see FIG. 8) will decrease as the emission angle α increases towards the side, but in contrast to FIG. 8, angle δ will not become 0 at α=90°. If the mirror is not roughened, this may affect the shaping of the reflected beam slightly.

Several other heat management approaches can be employed if space and aesthetic requirements limit the size of the heat sink 420. Some of these approaches are described in the above-mentioned U.S. patent application Ser. No. 12/387,341 titled "Remote-Phosphor LED Downlight." First the vanes or spiders (as they are called in this application) 330 supporting the light engine 410 can be used to draw heat away from the LED module. This can be accomplished by making the vanes out of a highly conductive material or by integrating heat pipes into their construction. The heat then can be transferred to a larger ring nearly the diameter of the can. Also, the LED driver module 114 can be located remotely from the LED array, for example, near or at the central opening of the reflector. If the opening in the reflector is large enough, the opening can still allow air to pass through it cooling the driver module in the process.

Several alternative convective air flow patterns can be created based on the location of the driver module and the convective path of the heat generated by the LED array. Convective loop 440 of FIG. 4 is one approach where the hot air rises and escapes out the top of the reflector, and then down between the reflector and an outer can. In an alternative approach, cool air can be brought down from the opening above the reflector via a different convective loop. In this approach hot air rises up the inside surfaces of a thermally conductive reflector. This could be created by moving the heat from the LED array to an outside ring at the bottom of the reflector (via a heat pipe for example). This creates a negative or suction force above the reflector as described in several writing of R. Buckminster Fuller (see for example pages 209-212 of "Critical Path", St. Martins Press, 1981). Cold air is pulled in at the base of the reflector and travels up the space between the reflector and the can. The mixed air falls down the center of the downlight striking the lens, whereupon the flow is radial outwards and downwards toward the floor.

If the ceiling construction permits, the outer can may be omitted, or may have a hole in it above the hole in the reflector. Hot air may then escape upwards into the ceiling space, or cool air may then be drawn downwards from the ceiling space.

The heat sink 420 for a 10-Watt LED downlight typically needs to be at least 40 mm in diameter. Also, lens 530 of FIG. 7 may be even larger than that diameter when scaled to work with a multi-chip source that is 3 mm across, rather than a single chip that is 1.2 mm across. Because the beam angle $Y_T$ sets a minimum ratio of the height H to the diameter of the lens, this in turn drives reflector diameter 505 to 8" (20 cm), somewhat excessive for a market that is accustomed to downlights 4-6" (10-15 cm) in diameter. The reflector diameter can be kept smaller, but this leads to a different ray pattern from that of FIG. 9 for generating the lens profile, so that horizontal rays are not deflected at all and the reflector does not extend below the plane of the source.

Figure 15:
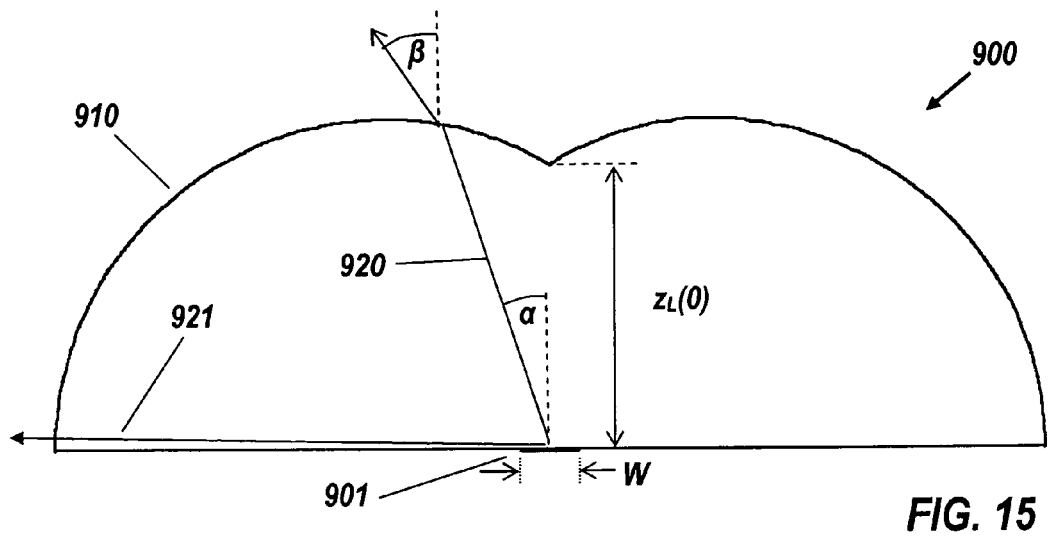
FIG. 15 shows the profile of an alternative cuspated lens.

FIG. 15 shows cuspated lens 900 with profile 910. Embedded source 901 emits typical ray 920 at off-axis angle α, which is refractively deflected at the surface of lens 900 to greater off-axis angle β. In FIG. 8 there is a constant 20° difference between the two angles α and β, causing lens profile 630 to have the shape of an equiangular spiral. In FIG. 15, however, horizontal ray 921 is not deflected at all, because the difference (β-α) falls linearly to zero as a goes from 0-90°.

Figure 16:
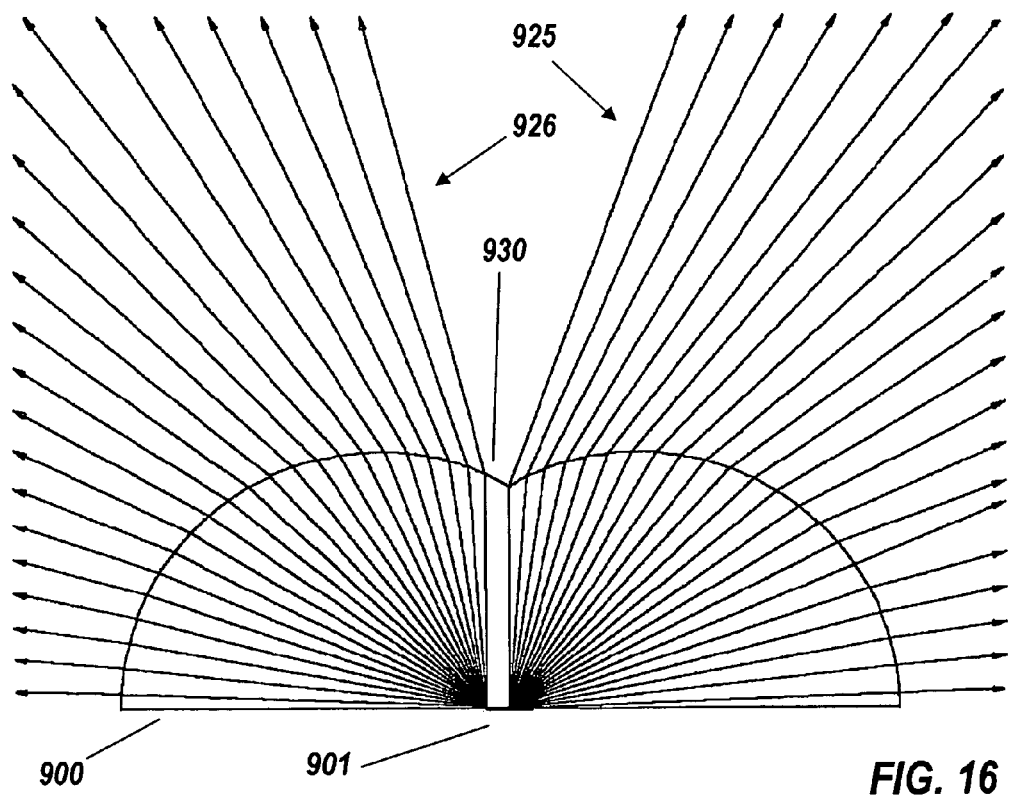
FIG. 16 shows the ray deflections of the lens shown in FIG. 15.

FIG. 16 shows lens 900 and source 901, as well as central ray fan 925 and left-side ray fan 926. Gap 930 is shown unilluminated in order to highlight that rays in this gap will not be collected by an annular reflector with a thermal chimney. This represents a small loss determined inversely by the ratio of the central height $Z_L(0)$ of lens 900 to source width W. Reducing lens size or increasing source size can make this loss become significant (over 10%). Ray fans 925 and 926 of FIG. 16 are specific sets of rays emitted by source 901, and are not representative of the actual emission of source 901, the analysis of which utilizes thousands of rays, from which the actual losses (the aforementioned 10%) will be determined.

Figure 17:
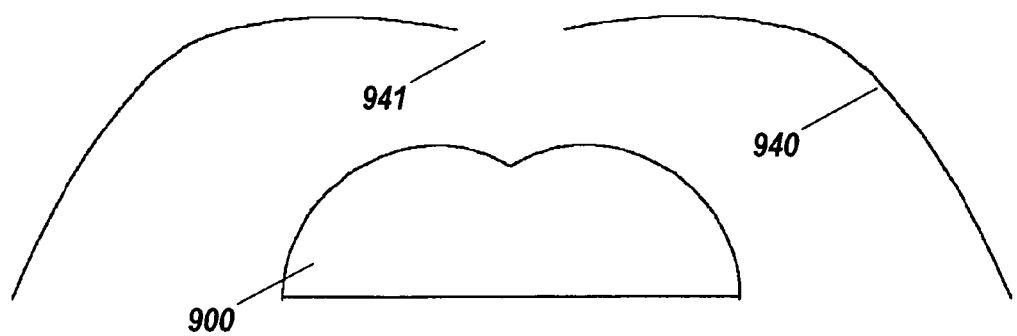
FIG. 17 shows the lens of FIG. 15 with a cross-over reflector.

FIG. 17 shows cuspated lens 900 along with reflector 940, shaped to work with the ray fans of FIG. 16. Central opening 941 serves the same function as opening 402 in reflector 401 of FIG. 4.

Figure 18:
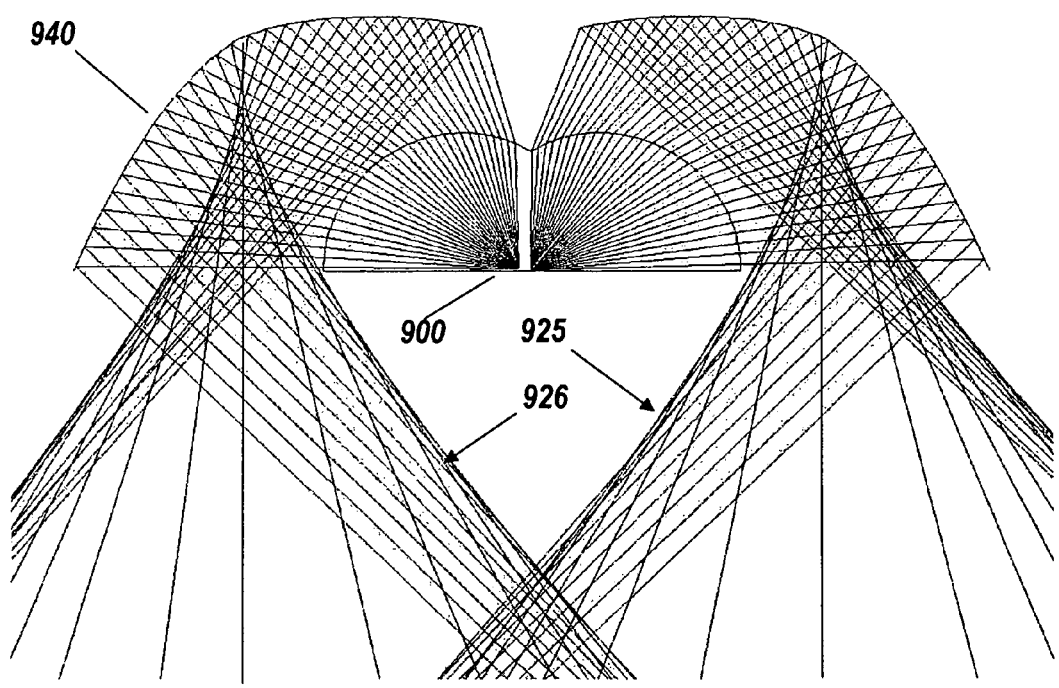
FIG. 18 shows the lens and reflector of FIG. 17 with ray fans.

FIG. 18 shows the action of reflector 940 on the ray fans of FIG. 16 after issuing from lens 900. The reflected rays of light fan 925 can be seen to sweep all the way across the target, instead of just from edge to center, as in FIG. 4B. Rays hitting the inner edge of the reflector are sent to the outside of the target on the same side of the axis, while rays hitting the outer edge are sent all the way across to the other side of the target. This causes the profile of reflector 940 to curve downward faster, giving the desired smaller diameter. The exact shape of reflector 940 can be calculated from the shape of lens 900 as described above, the desired distribution of illumination on the target plane, and values of other dimensions chosen in a particular case.

Figure 19:
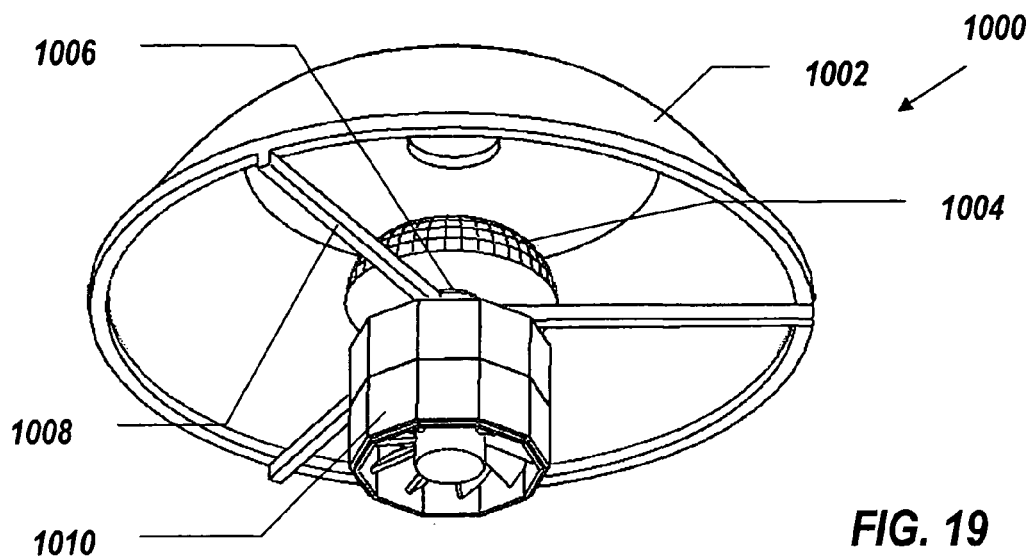
FIG. 19 is a perspective view of a further form of LED downlight with a convective cooling device.
Figure 20:
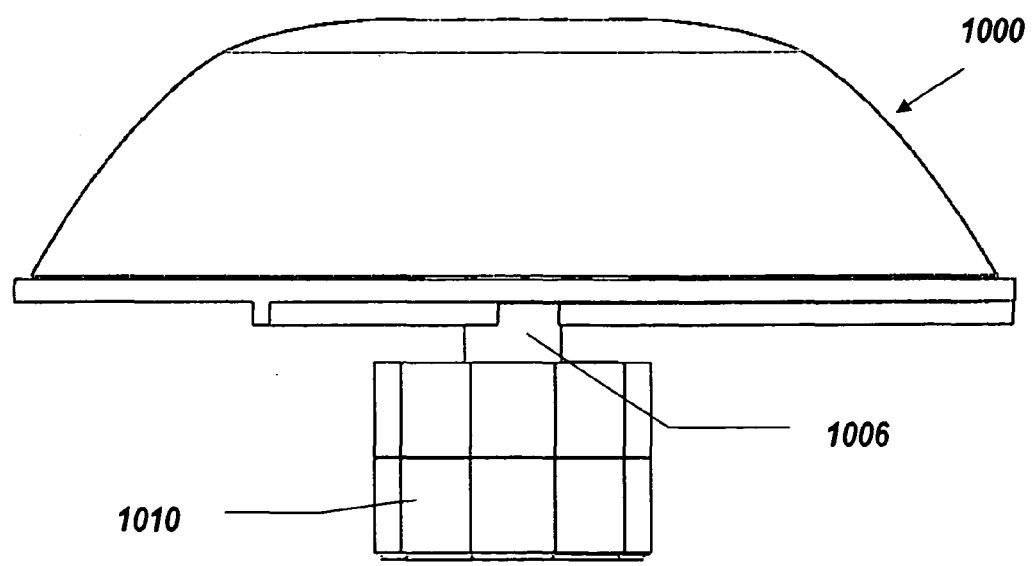
FIG. 20 is a side elevation view of the downlight shown in FIG. 19.

Referring to FIGS. 19 and 20, additional cooling devices may be provided to reduce the temperature of the LED light engine, or to enable a more powerful LED light engine to be used in the same mounting without overheating. A passive cooling system without moving parts is often preferred, to avoid unnecessary noise, vibration, or power consumption. FIGS. 19 and 20 show a downlight 1000 generally similar to that of FIG. 4, having an apertured reflector 1002, and having a flux-redistribution lens 1004 and an LED/phosphor light engine 1006 supported on a spider 1008. Instead of the finned heatsink 420 of FIG. 4, the downlight 1000 has a helically vaned heatsink 1010 similar to those described in Application No. 61/205,390, filed Jan. 16, 2009 by Falicoff and Sun, which is incorporated herein by reference in its entirety.

Figure 1:
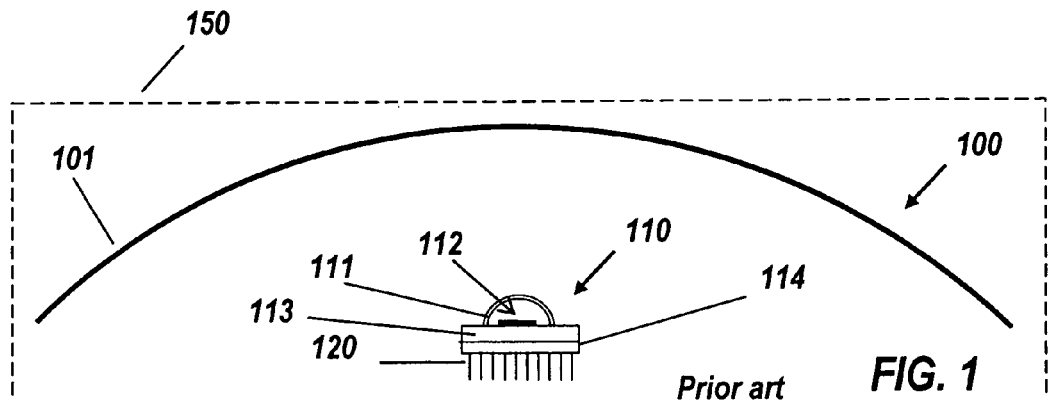
FIG. 1 shows a previously-proposed LED downlight with an LED package as a light source.
Figure 2:
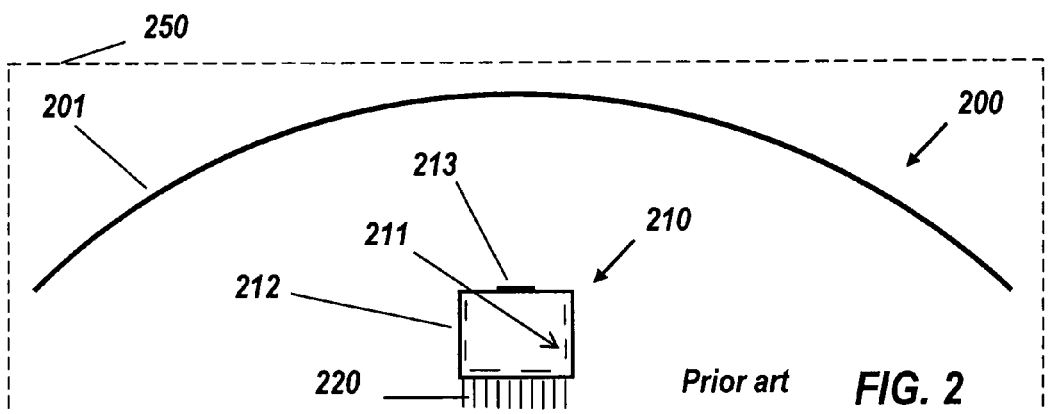
FIG. 2 shows a previously-proposed LED downlight with a multicolor integrating cavity as a light source.
Figure 3:
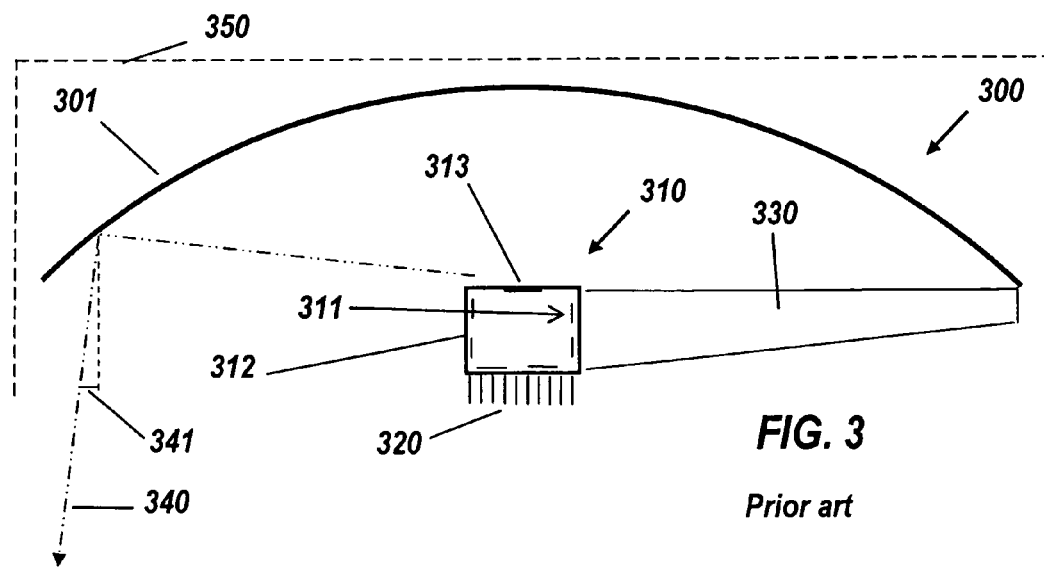
FIG. 3 shows a previously-proposed LED downlight with a blue LED integrating cavity and a remote phosphor as a light source.

In one example a remote phosphor downlight of the configuration shown in FIGS. 19 and 20, with 10 blue and 5 red LEDs, and the phosphor generating yellows and greens, is mounted in a standard 12-inch (30 cm) ceiling can, with the bottom of the heatsink approximately flush with the ceiling surrounding the can. That device can produce 1000 lumens light output from 17 watts of electrical power, with CCT=2900 K and CRI=89. At 25° C. ambient temperature, the heat sink temperature is 63° C., and the LED junction temperature is approximately 80° C. As mentioned above with reference to FIGS. 1 to 3, having the heatsink 1010 projecting below the bottom of the ceiling can 450 may be aesthetically disfavored in some circumstances. In other circumstances, however, the intricate structure of the helically vaned heatsink 1010 may become an aesthetic feature.

The present specification refers to a "downlight," and those skilled in the art will understand that the issues of heating and cooling discussed are most applicable when the device is oriented so as to direct its beam of light at least approximately downwards. However, the device may of course be used in other orientations without departing from the spirit and scope of the invention.

Where a beam angle, distribution of illumination, or other characteristic is described as "specified," "prescribed," or the like, that characteristic may be used as an explicit datum in a design process resulting in the optical device having that characteristic. Alternatively, that characteristic may be an observable property of the optical device, even if it was not used as an explicit datum. In the embodiments described, the beam distribution from the cuspated lens to avoid the aperture 402, etc., and the light distribution on the target plane will typically be provided as data before the lens and reflector design begins. However, when considering the final apparatus per se, the design process may not be determinable. The person of skill in the art will understand that in real systems a perfectly sharp edged beam of light is seldom attainable, and usual conventions may be used for, for example, the light intensity at the nominal boundary of an illuminated area.

Although specific embodiments have been described, the person skilled in the art will understand how features from different embodiments may be combined. For example, the mirror 401 shown in FIG. 4 or the mirrors 501, 502, 503 shown in FIG. 7 may be applied to all of the embodiments of FIGS. 4 through 14. The can 450 and the convection pattern 440 shown in FIG. 4, or any of the alternative cooling systems described in comparison thereto, may be applied to any of the embodiments shown in FIGS. 4 through 18. Any of the light engines 110, 210, 310, 410 may be applied to any of the subsequent embodiments, although dome 112 may be omitted from configurations in which the lens does not have a recess 831. The spider 330 of FIG. 3, or equivalent or alternative support structures, may be applied to any embodiment.

Although the optical surfaces of the lenses and mirrors have been drawn and described as smoothly curved, the skilled reader will understand that is not necessarily required, or even desired. For example, in some cases a faceted surface may be used to reduce the focusing power of the lens or reflector, in order to reduce or eliminate hotspots in the output beam pattern. For example, where a circularly symmetric beam pattern has a hotspot at the center of the beam pattern, the reflector may be faceted in annular rings.

The preceding description of the presently contemplated best mode of practicing the invention is not to be taken in a limiting sense, but is made merely for the purpose of describing the general principles of the invention. The full scope of the invention should be determined with reference to the Claims.

We claim:

1. A lighting device comprising:
   a light source;
   a reflector dish with a central opening facing the light source; and
   a lens between the light source and the reflector dish;
   wherein the lens is so arranged that light emitted from the source towards the central opening of the reflector dish is diffracted away from the central opening;
   wherein the reflector dish is arranged to reflect light received from the source through the lens back past the lens and source; and
   wherein the light source delivers light at a center of a rear face of the lens, and wherein a front face of the lens facing the central opening of the reflector dish has a central inward cusp and spirals outward away from the cusp relative to the center of the rear face.

2. The lighting device of claim 1, wherein the spiral is an equiangular spiral.

3. The lighting device of claim 2, wherein the light from the source is diffracted at the front face of the lens through an angle of between 10 and 30 degrees.

4. The lighting device of claim 1, wherein the angle of the spiral to the radius increases progressively away from the cusp.

5. The lighting device of claim 4, wherein the light source emits light into the lens over substantially a hemisphere centered on the cusp, and wherein at the periphery of the hemisphere the front face of the lens is substantially perpendicular to the light from the source.

6. The lighting device of claim 1, wherein the lens is circularly symmetric about a line from a center of the source to a center of the central opening.

7. The lighting device of claim 1, wherein the light source is an exit aperture of a light engine in optical communication with the lens.

8. A lighting device comprising:
   a light source;
   a reflector dish with a central opening facing the light source; and
   a lens between the light source and the reflector dish;
   wherein the lens is so arranged that light emitted from the source towards the central opening of the reflector dish is diffracted away from the central opening;
   wherein the reflector dish is arranged to reflect light received from the source through the lens back past the lens and source; and
   wherein the lens has a central indentation on a rear surface, and wherein the indentation has a surface from which the light from the source is dispersed into the lens.

9. The lighting device of claim 8, wherein the indentation is hemispherical, and the rear surface of the lens is flat and highly reflective such that direct and reflected rays produce a substantially uniform angular distribution of light intensity.

10. The lighting device of claim 1, wherein the reflector dish is so arranged that light from the source reaching an inner part of the dish around the aperture is reflected outward past the lens, light from the source reaching an outer part of the dish furthest from the aperture is reflected inward past the lens, and light from the source reaching intermediate parts of the dish is reflected in progressively intermediate directions.

11. The lighting device of claim 10, wherein the light reflected from the outer part of the dish is sent to the center of a prescribed radial distribution of illuminance.

12. The lighting device of claim 10, wherein the light reflected from the inner part of the dish is sent to an outer periphery of a prescribed radial distribution of illuminance on the same side of the device as its point of reflection and the light reflected from the outer part of the dish is sent to the outer periphery of the prescribed radial distribution of illuminance on the opposite side of the device from its point of reflection.

13. A light comprising a light source with an exit aperture, a cuspated flux-redistribution lens disposed over said aperture, and a reflector dish with a central opening disposed over said lens, said lens in optical communication with said exit aperture, said light passing through an outer surface of said lens, said outer surface shaped so as to diverge said light as it exits into air, said diverged light having a central region of zero intensity corresponding to said central opening, said reflector dish receiving said diverged light and reflecting the diverged light back round said lens and light source, said reflector dish shaped so as to produce a specified beamwidth.

14. A light according to claim 13, wherein the light source is an LED light source, wherein the lens is in optical contact with the exit aperture such that light from the exit aperture has a hemispheric distribution within said lens, said diverged light having said zero intensity at off-axis angles less than a selected angle having a value between 10° and 30°, and said reflector dish receiving said diverged light and reflecting it downwards with a specified beamwidth between 20° and 60°.

15. The light of claim 13, wherein said flux-redistribution lens is circularly symmetric with a radial cross-section that is equiangular spiral.

16. The light of claim 13, wherein said light source is an integrating box with an exit aperture, said box comprising walls with one or more LED chips disposed thereupon, said walls being sufficiently thermally conductive to remove waste heat from said LED chips, the interior surface of said walls being diffusely reflective, the exterior surface of said walls also comprising a heat sink for convective heat removal by ambient air.

17. The light of claim 13, wherein said flux-redistribution lens has a central indentation on its rear surface.

18. The light of claim 13, wherein the light from the reflector dish illuminates a planar target with a prescribed radial distribution of illuminance generated by said reflector sending rays from its center to the outer radius of said prescribed radial distribution of illuminance and rays from its outer edge to the center of said prescribed radial distribution of illuminance.

19. The light of claim 13 wherein the light from the reflector dish illuminates a planar target with a prescribed radial distribution of illuminance generated by said reflector sending rays from its center to the outer radius of said prescribed radial distribution of illuminance and rays from its outer edge to the opposite outer radius of said prescribed radial distribution of illuminance.

* * * * *